No. 872,957. PATENTED DEC. 3, 1907.
D. P. MOHR & J. A. DUVANEL.
HARROW.
APPLICATION FILED JULY 1, 1907.

2 SHEETS—SHEET 1.

Witnesses

Inventors
D. P. Mohr
J. A. Duvanel
by John K. Hall
their Attorney

No. 872,957.  
PATENTED DEC. 3, 1907.  
D. P. MOHR & J. A. DUVANEL.  
HARROW.  
APPLICATION FILED JULY 1, 1907.

2 SHEETS—SHEET 2.

UNITED STATES PATENT OFFICE.

DIEDERICH PETER MOHR AND JOHN AUGUSTE DUVANEL, OF MACKINAW, ILLINOIS.

HARROW.

No. 872,957.          Specification of Letters Patent.          Patented Dec. 3, 1907.

Application filed July 1, 1907. Serial No. 381,695.

*To all whom it may concern:*

Be it known that we, DIEDERICH PETER MOHR and JOHN AUGUSTE DUVANEL, citizens of the United States, residing at Mackinaw, in the county of Tazewell and State of Illinois, have invented certain new and useful Improvements in Harrows, of which the following is a specification.

This invention relates more especially to improved means for the attachment of a clod crusher or pulverizer to a disk harrow or other desired implement to work in combination with the said pulverizer, the primary object of said invention being to provide means susceptible of such adjustment as to adapt a given pulverizer to use with disk harrows of various kinds, for example, to those with small disks as well as to those with large disks.

A further object of the said invention is to embody in this attaching means, means whereby the pulverizer may be allowed to engage the ground as in operation or supported in an elevated position out of engagement with the ground when not in operation.

Further objects of the said invention are the providing of improved means for supporting the pulverizer frame and the providing of an adjustable wheel support to compensate for the adjustable attachment to the disk harrow.

With the foregoing objects in view the said invention consists in the novel combination and arrangement of parts herein shown and described and more particularly pointed out in the accompanying claims.

Figure 1:
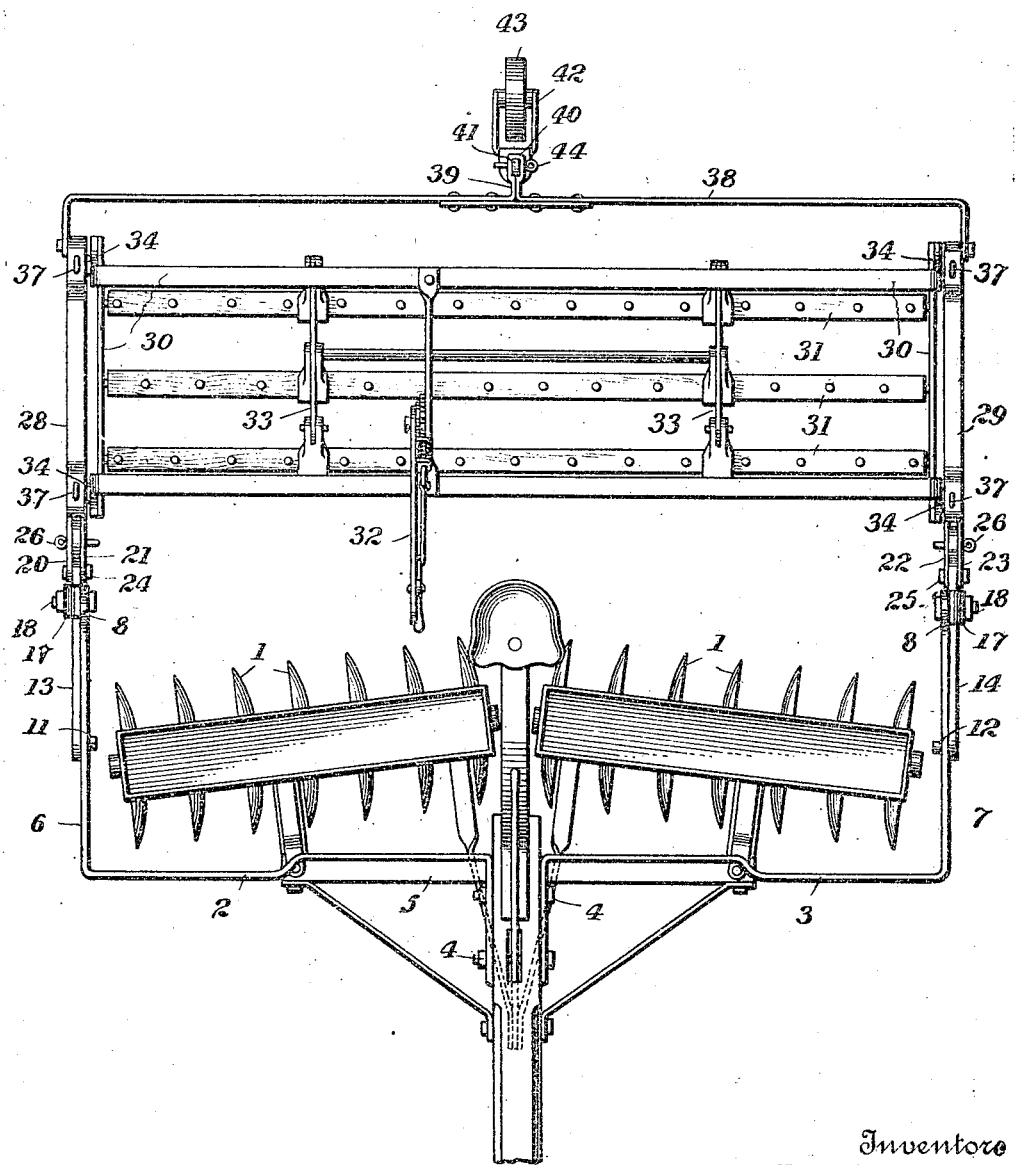
Figure 2:
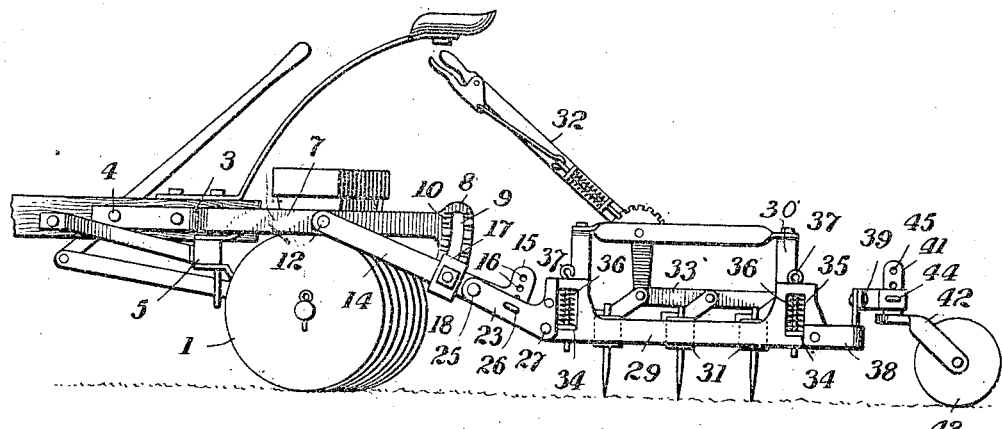
Figure 3:
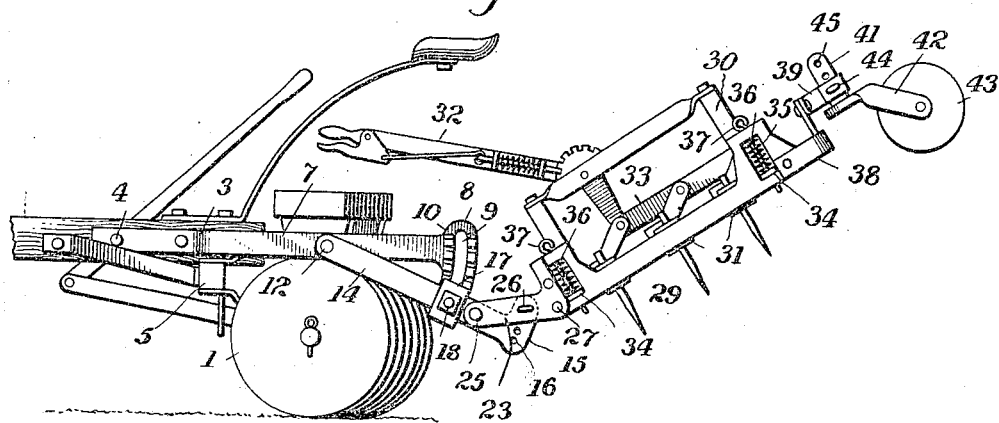
Figure 4:
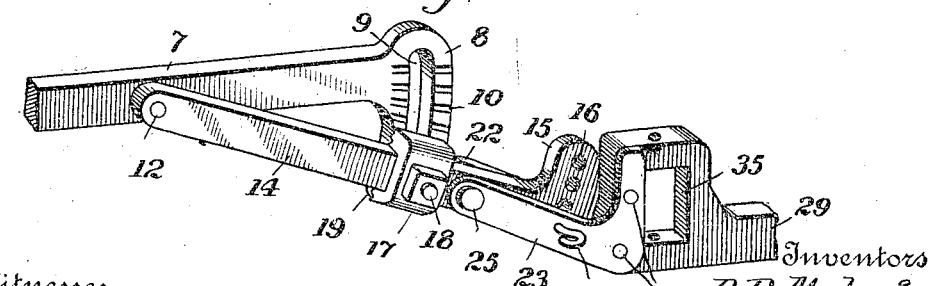

In order to more fully describe the said invention reference will be had to the accompanying drawings, which form a part of the specification, and wherein:

Figure 1, is a top plan view of a combined disk and tooth harrow embodying one form of the said invention; Fig. 2, a side elevation thereof with tooth harrow in an operative position; Fig. 3, a similar view showing the tooth harrow in the raised position, and Fig. 4, an enlarged detail fragmentary perspective view of the mechanism for attaching the tooth harrow to the disk harrow.

Referring to the accompanying drawings, 1, represents a disk harrow or spader of any desired construction, and 2, 3, supporting arms for the attachment of the tooth harrow section to the disk harrow, said arms being made fast to the disk harrow in any suitable way as for example by being bolted to the disk harrow frame, as at 4, 4. In the form illustrated, these arms extend to each side of the harrow along the top of the cross piece 5 of the harrow frame, and thence backward to form the side arms 6 and 7. The rear end of each of these arms 6 and 7 terminates in a segment 8 having a central slot 9 with notches or serrations 10 on one of the faces of each of said segments, the object of which will hereinafter more fully appear.

Pivoted to arms 6 and 7 respectively, at suitable points, 11 and 12, forward of the segments 8, are two arms 13, 14, each of which is provided with a transversely extending head 15 having therein a transverse row of holes 16, the object of which will presently more fully appear. These arms 13 and 14 are angularly adjustable on their pivots 11 and 12 respectively, and for the purpose of holding them in adjustment in several of said positions, each is provided with clamping means comprising, in the case shown, a clamping plate 17, adapted to straddle its respective arm and provided with a nut and bolt connection 18 whereby the said clamping plates are held in engagement with the outer faces of the segments 8 adjacent thereto, the said bolts passing through the slots 9 in said segments. For providing against slipping of the clamping plates 17, each is toothed as at 19 (see Fig. 4) to engage the serrations or notches 10, on the segments 8.

The arms 13 and 14 constitute members of two articulated arms forming an adjustable connection between the supporting means on the disk harrow, and the tooth harrow. The other members of these articulated arms consist each of pairs of hinged extensions or arms 20, 21 and 22, 23. The arms 13 and 14 are hinged respectively between arms 20 and 21, and 22 and 23 by means of pivots 24 and 25, the ends of the arms 13 and 14 provided with the perforated heads 15 extending well along between the respective pairs of said hinged extension arms. These arms 20, 21, and 22, 23 may be held in different positions of angular adjustment by means of pins 26 adapted to extend transversely through said extensions and through holes 16.

The hinged arms 20, 21, and 22, 23, as shown, extend along the sides of the arms 13 and 14 and beyond the headed ends thereof. At their ends which thus extend beyond the ends of the arms 13 and 14, the pairs of hinged arms 20, 21, and 22, 23 are made fast respectively in any suitable way as by bolts 27, to side bars 28 and 29 which form supports for a harrow frame 30 having a plurality of tooth beams 31 mounted thereon. These tooth beams are shown mounted for rocking motion by the lever 32 acting through the link connection 33, the said mounting of the said beams and the means shown for rocking them, however, is old in the art and is not herein claimed.

The harrow frame 30 is attached to the side bars 28 and 29 by means of four lugs or extensions 34, one at each corner of the said frame. The lugs normally rest upon the side bars 28, 29 in vertical guide ways 35 formed in said bars near one end of each, and the said frame is held against movement upward under the tension of coil springs 36, one mounted in each of said vertical ways 35 above the lug 34 therein. Retaining pins 37 passing downward through the springs 36, lugs 34 and side bars 28, 29, act to hold said parts together.

The side bars 28 and 29 are connected in the rear by means of a bar 38 provided with an extension 39, having an eye 40 through which passes a bar 41 connected to a bifurcated bracket 42 in which is journaled a wheel 43 adapted to run on the ground when the harrow is in operation. By means of a pin 44 passing through the extension 39 and a series of holes 44 in the bar 41, the elevation of the harrow frame with respect to the wheel may be varied.

From the foregoing description it will be readily seen that the adjustable connection between the arms 6 and 7 and the pivoted arms 13 and 14 will permit of a variation in the height at which the tooth harrow may be supported, thus regulating this height to conform to the height of the disks of the disk harrow. If it is desired to support the tooth harrow in a slanting position or to raise it entirely from the ground as shown in Fig. 3, this may be done by varying the angular adjustment of the hinged arms 20, 21, and 22, 23. In the raised position shown in Fig. 3, the tooth harrow may be carried attached to the disk harrow without liability to run up against stumps or other obstacles on the ground. The attachment of the wheel 43 to the pulverizer also permits of an adjustment of the rear end of the pulverizer to compensate for the adjustment at the forward end thereof.

While we have herein shown only one specific form of our said invention we may modify the same without departing from the spirit of the same.

Having thus described our invention what we claim is:—

1. Means for the connection of one harrow section with another, comprising supporting means adapted to be connected to one of said harrow sections, arms pivoted on opposite sides of said harrow section on said supporting means for angular adjustment vertically, and hinged extensions on said arms respectively, said extensions connected to the other harrow section.

2. The combination with supporting arms for connection to a harrow, of arms pivoted to said supporting arms for angular adjustment, clamping means to hold said pivoted arms in adjustment, extensions hinged on said arms for angular adjustment and provided with means to hold them in adjustment, and a harrow connected to said hinged extensions, the said hinged extensions permitting the elevation from the ground of the harrow connected thereto and the retention of the same in the elevated position.

3. The combination with supporting arms for connection to a harrow, of arms pivoted to said supporting arms for angular adjustment, clamping means to hold said pivoted arms in adjustment, extensions hinged on said arms for angular adjustment and provided with means to hold them in adjustment, a harrow rigidly connected to said hinged extensions, and a vertically adjustable supporting wheel connected to the rear of said last named harrow.

4. The combination with a disk harrow, of supporting arms attached thereto, arms pivoted to said supporting arms for angular adjustment, clamping means acting to hold said pivoted arms in positions of adjustment, arms pivoted on each of said second named arms and forming extensions thereto, clamping means to hold said extensions in angular adjustment, harrow side bars rigidly connected respectively to said arm extensions, tooth harrow beams supported on said side bars, a rear frame portion connecting said side bars, and a vertically adjustable wheel connected to said rear frame portion.

5. In a harrow, the combination with a harrow section comprising a frame, a plurality of toothed bars mounted in said frame, side bars in which said frame is mounted for movement vertically relative thereto, springs arranged to oppose said movement, a second harrow section, and adjustable means connecting one of said harrow sections with the other, said means comprising adjusting pivoted arms, adapted to permit of the raising and lowering of said first named harrow section with respect to the second named section, and clamping means to retain the said pivoted arms in adjusted positions.

In testimony whereof we affix our signatures in presence of two witnesses.

DIEDERICH PETER MOHR.
JOHN AUGUSTE DUVANEL.

Witnesses:
CASSEL HANSON,
SAIN WELTY.